United States Patent [19]

Maeda

[11] 4,278,334

[45] Jul. 14, 1981

[54] ILLUMINATION CONTROL APPARATUS FOR PROJECTION DEVICE

[75] Inventor: Masahiro Maeda, Toyokawa, Japan

[73] Assignee: Minolta Camera Kabushiki Kaisha, Osaka, Japan

[21] Appl. No.: 97,608

[22] Filed: Nov. 26, 1979

[30] Foreign Application Priority Data

Dec. 1, 1978 [JP] Japan ............... 53-149205
Dec. 12, 1978 [JP] Japan ............... 53-154376

[51] Int. Cl.³ .......................................... G03B 21/20
[52] U.S. Cl. ................................. 353/85; 353/87; 355/69
[58] Field of Search ............... 355/69, 67; 362/285, 362/286, 287, 288, 289, 295, 326; 353/85, 87

[56] References Cited

U.S. PATENT DOCUMENTS

| | | | |
|---|---|---|---|
| 2,878,718 | 3/1959 | Post | 353/87 |
| 2,937,569 | 5/1960 | Wilton | 353/81 |
| 3,472,586 | 10/1969 | Zuili | 353/30 |
| 3,510,220 | 5/1970 | Bures | 353/87 |
| 3,815,992 | 6/1974 | Ogawa | 355/69 |
| 3,818,216 | 6/1974 | Larraburu | 362/295 |
| 4,029,956 | 6/1977 | Leibundgu | 362/268 |
| 4,113,378 | 9/1978 | Wirtz | 355/69 |
| 4,172,657 | 10/1979 | Watanabe et al. | 355/55 |

FOREIGN PATENT DOCUMENTS

861897 2/1941 France .

*Primary Examiner*—John W. Shepperd
*Attorney, Agent, or Firm*—Wolder, Gross & Yavner

[57] ABSTRACT

An illumination control apparatus for a device for projecting images at a variable magnification, comprises a light source unit for illuminating an object and a condenser lens unit at least one of the units being movable along the optical axis of projection, with the power supply to the light source unit being varied with such movement. When the magnification of projection of the device is varied, at least one of the units is shifted with a variation of the power supplied to the light source to provide a constant illumination and a uniform distribution of illuminations to the plane of the projected image of an object irrespective of a variation in the projection magnification.

25 Claims, 25 Drawing Figures

FIG.1
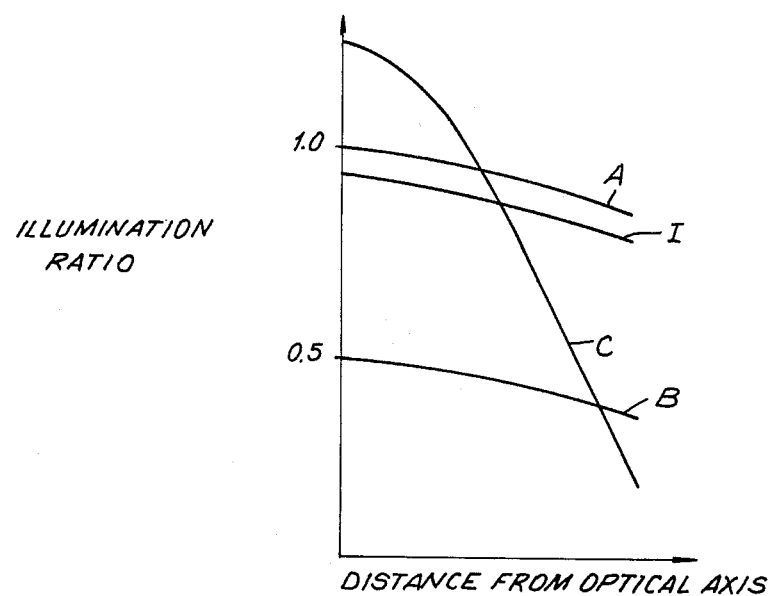
ILLUMINATION RATIO
DISTANCE FROM OPTICAL AXIS
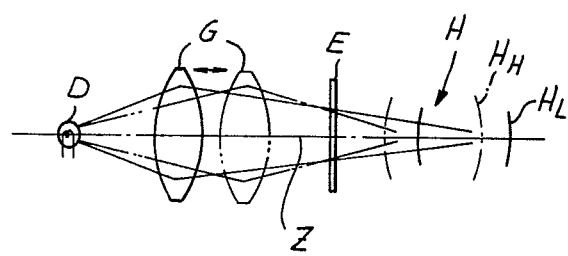
FIG.2

FIG. 14
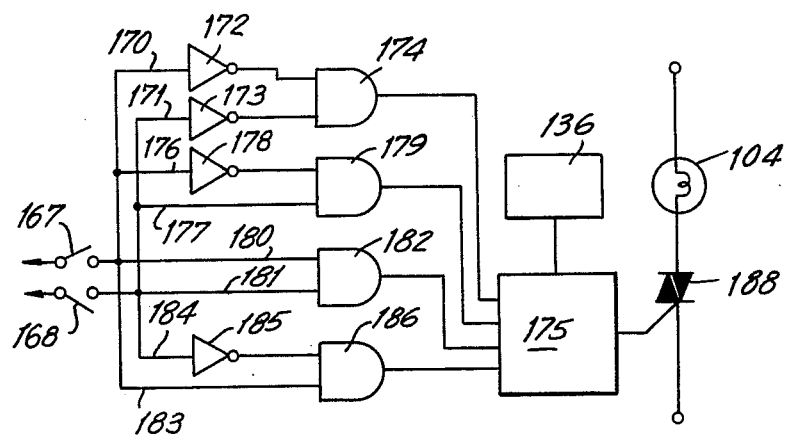
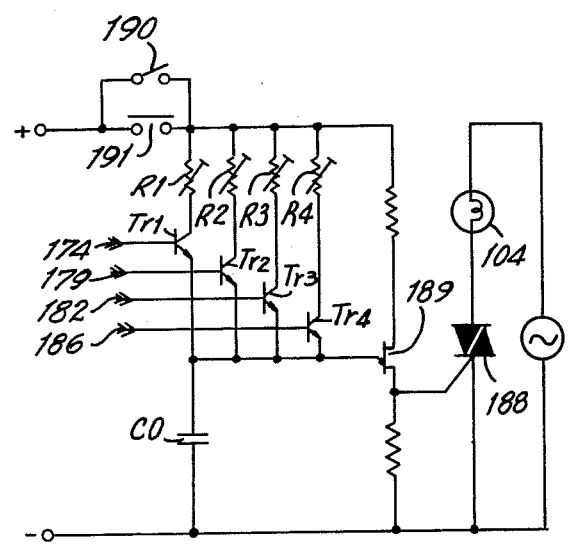
FIG. 15

ILLUMINATION CONTROL APPARATUS FOR PROJECTION DEVICE

BACKGROUND OF THE INVENTION

The present invention relates generally to improvements in an illumination control apparatus in an optical projection device such as a microreader, reader-printer, or the like, and it relates more particularly to an improved illumination control apparatus for providing a constant illumination and a uniform distribution of illumination in the plane of the image formed by an optical projection device independent of variations in the projection magnification of the device.

There are various standards of reduction ratio for microfilms which are widely used for recording literature, papers, documents, etc. and films of many different sizes and reduction ratios are in use. When such microfilms are enlarged and projected with a single reader or reader-printer for viewing or copying, a lens is selectively used which has a projection magnification corresponding to the size or reduction ratio of the particular film to be projected. Thus, whenever the projection lens is changed, the area of the projected image on the screen or at the exposure station involves a variation in the illumination and in the distribution of illumination due to the difference in the projection magnification and the f-number of the lens.

With conventional reader-printers, therefore, the power supply to the light source is altered with a change of the projection lens to maintain the illumination or the amount of exposure at a constant level on the screen or at the exposure station, as described in U.S. Pat. No. 4,172,657.

In the case of such a reader-printer, a plurality of projection lenses are mounted on a changeover plate at predetermined locations, so that each time a projection lens is shifted or another projection lens is used, the power supply must be manually adjusted in corresponding relationship with the selected lens. Accordingly, the use of many different projection lenses requires the frequent manual adjustment of the power supply which is highly inconvenient and cumbersome.

Futhermore, when the power supply energizing the light source is merely controlled, it is impossible to provide a constant or uniform distribution of illumination to the image projected onto the screen or exposure station, and an uneven exposure will occur at the exposure station.

U.S. Pat. Nos. 3,472,586 and 4,029,956 issued Oct. 14, 1969 and June 14, 1977, respectively, describe a device for moving the light source to alter the distance between the condenser lens and the light source and a device for altering the distance between the condenser lens and the light source in accordance with variations in the projection magnification. However, difficulty is encountered with such devices in maintaining a constant or uniform illumination on the screen or at the exposure station regardless of the projection magnification.

SUMMARY OF THE INVENTION

It is a main object of the present invention to provide an improved illumination control apparatus in a device for projecting images at a variable magnification.

Another object of the present invention is to provide an illumination control apparatus which effects a constant illumination and a constant or uniform distribution of illumination at the plane of a projected image irrespective of variations in the projection magnification.

Still another object of the invention is to provide an illumination control apparatus by which with any variation in the projection or image magnification, the distribution of illumination over the plane of the projected image is corrected by altering the distance between an illuminating light source and a condenser lens and varying the supply of power to the light source.

The above and other objects of the present invention are achieved by an illumination control apparatus for a device for projecting images at a variable magnification, comprising a light source and a condenser lens means at least one of which is movable relative to the other, and a power supply adjustably energizing the light source, so that when the projection magnification of the projection device is varied, the distance between the light source and the condenser lens means is altered in operative relationship with the adjustment of the power supply to provide a constant illumination and a constant or uniform distribution of illumination at the plane of the projected image irrespective of the variation of the projection magnification.

BRIEF DESCRIPTION OF THE DRAWINGS

The above and other objects and features of the present invention will become apparent from the following description taken in conjunction with the accompanying drawings which illustrate preferred embodiments thereof and in which:

FIG. 1 is a diagram illustrating the principle of the present invention;

FIG. 2 is a diagram illustrating the shift of a condenser lens according to the principle of the present invention;

FIG. 14 is an electric circuit diagram of the illumination control network;

FIG. 15 is a detailed fragmentary diagram of the circuit of FIG. 14;

DESCRIPTION OF THE PREFERRED EMBODIMENT

Figures 3, 4:
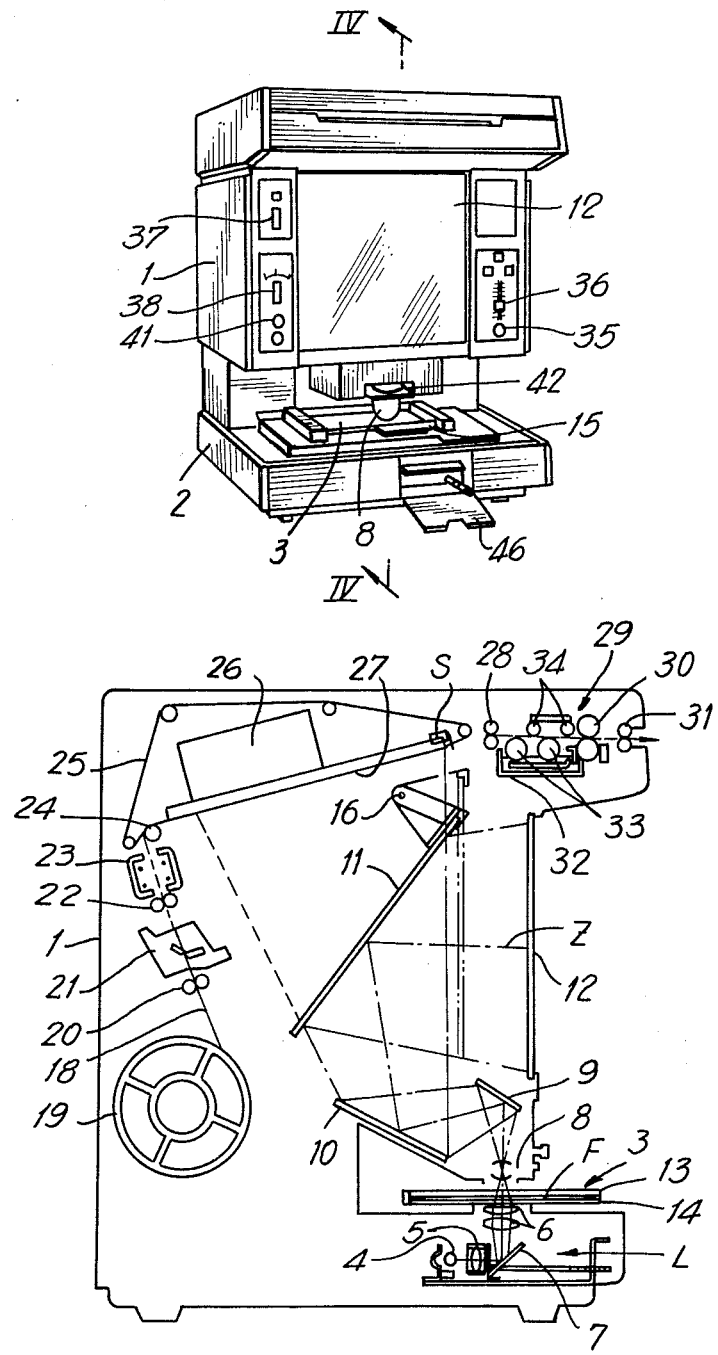
FIG. 3 is a perspective view of a reader-printer embodying the present invention.
FIG. 4 is a sectional view taken along the line IV—IV in FIG. 3.

The principle of the present invention is hereinafter explained with reference to FIGS. 1 and 2 of the drawings.

When a subject is uniformly illuminated and an image thereof projected by a low-magnification projection lens with the subject positioned within the angle of view of the lens, the illumination ratio of the image projected on a focal plane such as a screen is generally slightly lower at the peripheral portion of the screen or image than at the center thereof, namely on the optical axis, as represented by the curve A in FIG. 1 in which the illumination ratio on the screen is plotted as ordinate vs. the distance from the point of the optical axis on the screen as abscissa. If the projection lens alone is replaced by a lens of higher magnification under this condition, the angle of view diminishes, with the result that the illumination ratio on the screen uniformly decreases, as shown in FIG. 1 by the curve B, from the values of curve A. Accordingly, if it is desired to increase the illumination on the screen to a level close to that of curve A, the intensity of the light source must be increased by increasing the power supplied to the light source.

When a subject is uniformly illuminated and projected through a high-magnification projection lens with the subject within the angle of view of the lens and the resulting illumination ratio on the screen is represented by the curve A in FIG. 1, the change of the lens to a lens of lower magnification leads to the illumination distribution result indicated by the curve C in FIG. 1, in which the illumination on the screen is high at its center but exceedingly low at the peripheral portion of the screen.

It therefore follows that the irregularities in illumination on the screen can be eliminated by uniformly illuminating the subject over a wide area when a projection lens of low magnification is used and concentrically illuminating part of the subject when a projection lens of high magnification is used.

With reference to FIG. 2 showing the principle of the invention, a light source D and an object E are spaced apart a predetermined distance, and a condenser lens G provided therebetween is shiftable along the optical axis Z. The condenser lens G is shifted in accordance with the magnification of a projection lens H. Stated more specifically when the projection lens H is a lens HL of low magnification, the condenser is moved toward the light source D to uniformly illuminate the object E over a wide area. If the projection lens H is a lens of high magnification, HH, the condenser lens G is moved away from the light source D to concentrically illuminate part of the object E. When the high-magnification projection lens HH is used with the condenser lens G thus shifted, the light source D, even with the same power supply as when the low-magnification projection lens HL is used, gives the screen an illumination which, as indicated by a curve I in FIG. 1, is slightly lower than is afforded by the use of the low-magnification lens HL. The curve I can be raised to the curve A by a small increase in the power supply to the light source D.

The shift of the condenser lens G described above affords a uniform distribution of illumination at the screen regardless of the alteration of the magnification of the projection lens H, while the alteration of the magnification requires only a small variation in the power supplied to the light source D.

Although the condenser lens G is made shiftable in FIG. 2 for correcting the distribution of illuminations over the screen, the condenser lens G may alternatively be stationary for use with a movable light source D which is brought toward the lens G for a low-magnification projection lens or away from the lens G for the high-magnification projection lens.

The same effect as produced by the arrangement of FIG. 2 can be achieved when both the light source D and condenser lens G are shiftable.

Referring now to FIGS. 3 and 4 which illustrate a preferred embodiment of the present invention as applied to a reader-printer, a fiche film F is held in a planar position by a carrier 3 which is movable forward, backward and sidewise on the base 2 of the main body 1 of the reader-printer. A light source 4 illuminates the film F by means of groups of condenser lenses 5 and 6 and a mirror 7, and a projection lens 8 projects an image of the film subject via mirrors 9, 10 and 11 onto a screen 12 on the front face of the main body 1.

The carrier 3 includes an upper glass plate 13 and a lower glass plate 14 provided with a knob 15. The upper glass plate 13 is attached to the lower glass plate 14 by an unillustrated hinge connection for opening and closing of the carrier. During copying, the mirror 11 is swung about a pivot 16 to the position shown by broken line in FIG. 4.

Photosensitive paper 18 is wound on a spool 19 located in body member 1. Arranged along the path of transport of the photosensitive paper 18 partially indicated by broken line in FIG. 4 are a pair of feed rollers 20, a cutter 21, a pair of transport rollers 22, a charger 23, a press roller 24, a suction belt 25 and a suction unit 26. The paper 18 is exposed to light at an exposure station 27 provided by the portion of the suction belt 25 held in a planar position by the suction unit 26. Further arranged along the path of transport beyond the exposure station 27 are a switch S, a pair of transport rollers 28, a developing unit 29, a pair of squeeze rollers 30 and a pair of absorbent rollers 31. The developing unit 29 includes a developer container 32 filled with a developer, developing electrode lower rollers 33, 33 partly immersed in the developer and developing electrode upper rollers 34, 34 above the rollers 33, 33.

The main body 1 is provided on the front side thereof with a copy switch 35, an exposure control knob 36, a copy number setting dial 37, a copy size changing switch 38 and a power supply switch 41.

Figure 5:
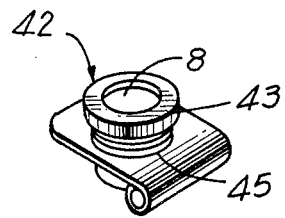
FIG. 5 is a perspective view of an interchangeable projection lens unit of the reader-printer.

FIG. 5 shows a unit 42 for changing the projection lens 8. The unit 42 comprises the lens 8 provided with a knurled ring 43 for focus adjustment of the lens and a platelike holder 45 having an opening engaging and supporting the lens 8 and being detachably mountable to the main body 1.

Figure 6:
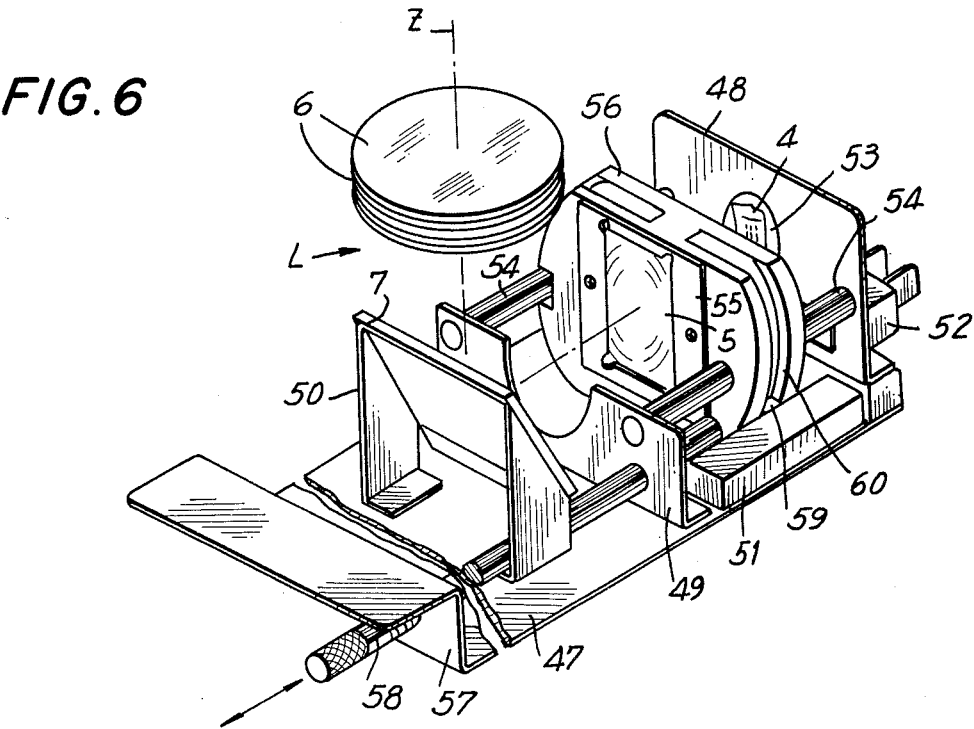
FIG. 6 is a perspective view of the illumination apparatus of the reader-printer embodying the invention.

FIG. 6 is a perspective view showing subject or film illumination apparatus L in accordance with the present invention and housed in the base 2 behind a front door 46. The apparatus L includes a frame 47 secured to the base 2 and provided with brackets 48 and 49, a mount 50 for the mirror 7 and a variable resistor 51. Supported on the bracket 48 are a light source 4, a plug 52 for the light source 4 and a spherical reflecting mirror 53. A pair of parallel slide rods 54, 54 extend between and is supported by the brackets 48 and 49. A movable member 56 carrying the group of lens 5 which is secured thereto by a holder 55 is longitudinally slidably movably supported on the slide rods 54, 54. The movable member 56 is provided with a handle 58 extending longitudinally through the bracket 49 and an upright flange or lug 57 formed on the frame 47 and toward the front of the base 2. The handle 58 has a scale thereon. The movable member 56 has formed in a side portion thereof a groove 60 which engages a knob 59 of the variable resistor 51.

Figure 7:
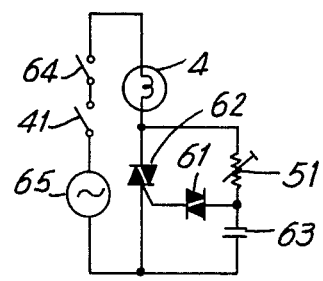
FIG. 7 is a diagram of the electric circuit of the illumination apparatus of FIG. 6.

The variable resistor 51 is constructed and connected to provide lower and higher resistances as the handle 58 is shifted respectively toward and away from the front of the base 2. As shown in the circuit diagram of FIG. 7, the variable resistor 51 has one terminal connected through a Diac 61 to the gate of Triac 62 and its other terminal connected to the junction of the anode of Triac 62 and one terminal of lamp 4. A capacitor 63 is connected between the cathode of the Triac 62 and the junction of resistor 51 and Diac 61. An AC power supply 65 is connected between the anode and cathode of the Triac 62 through the light source 4, a switch 64 closable by unillustrated means, and the power supply switch 41.

Considering now the operation of the reader-printer described above, when the device is used as a reader, closing of the power supply switch 41 closes the switch 64 in operative relation to the switch 41 to turn on the light source 4. The light from the light source 4, including the rays reflected from the spherical reflecting mirror 53, is concentrated by the group of condenser lenses 5, reflected from the mirror 7 and passes through the group of condenser lenses 6 to illuminate the film F held between the upper and lower glass plates 13 and 14 of the carrier 3. The image of the illuminated film is projected by the projection lens 8 onto the screen 12 by way of the mirrors 9, 10 and 11. Since the illumination of the projected image in the center of the screen, namely near the optical axis Z differs from that at the peripheral portion, the handle 58 behind the door 46 is operated to shift the condenser lens group 5.

For example, when the projection lens 8 has a low magnification, the lens group 5 is brought closer to the light source 4 by pushing in the handle 58 to uniformly illuminate the film F over a wider area as illustrated in FIG. 2.

When the condenser lenses 5 are brought to the best position by the handle 58 so as to illuminate the screen with a minimum illumination difference between the center and the peripheral portion, the peripheral screen portion is brightest. With the shift of the lenses 5, the movable member 56 attached to the handle 58 moves the knob 59 of the variable resistor 51, whereby the resistance of the resistor 51 is increased and to accordingly increases charging time to the capacitor 63. This decreases the conduction angle of the Triac 62 and reduces the power supplied to the light source 4.

To replace the low-magnification lens 8 with another projection lens 8 of high magnification, the holder 45 with the low-magnification lens 8 is withdrawn from the main body 1, and the holder 45 with the high-magnification lens 8 is inserted in the main body 1.

The handle 58 is then pulled outwardly to adjust for the high-magnification lens 8 to thereby shift the condenser lens group 5 away from the light source 4 and thereby concentrically illuminate the film F over a reduced area. By this procedure, the lens group 5 is brought to optimum position as in the foregoing case so that when the image is projected through the high-magnification lens 8, the peripheral portion of the screen 12 has maximum brightness. With the shift of the lens group 5, the movable member 56 reduces the resistivity of the variable resistor 51, consequently shortening the capacitor charging time and increasing the conduction angle of the Triac 62 to thus increase the power supplied to the light source 4. The image projected on the screen 12 therefore has an increased illumination equivalent to the illumination afforded by the low-magnification lens 8.

The projection lens 8 is further replaceable by a lens of medium magnification in the same manner as above. The condenser lens group 5 is then shifted by the handle 58 to an intermediate position between the low-magnification position and the high-magnification position to supply medium power to the light source 4.

With the above system, the handle 58, when operated in the manner explained reduces the illumination differences on the screen 12 between the center and the peripheral portion while concurrently varying the power supplied to the light source 4 in accordance with the projection magnification. Thus the screen can be illuminated at a constant or uniform intensity with a constant or uniform illumination distribution despite variations in the projection magnification.

When the handle is operated for the first time for each projection lens, the magnification or like indication may be marked on the scale of the handle 58. The operator then need not watch the screen when operating the handle thereafter.

The device is operated as a printer in the following manner. Before printing, the device is used as a reader to set the condenser lenses 5 in the best position. The exposure control knob 36 is set to a proper exposure time for the desired print density. The desired number and size of copies are set by the dial 37 and the switch 38 respectively. When the copy switch 35 is then closed, the switch 64 is opened to temporarily turn off the light source 4, and unillustrated means swings the mirror 11 to the broken line position in FIG. 4 to block the passage of light into the device through the screen 12. The photosensitive paper 18 is subsequently fed from the spool 19 and cut to the desired size. The cut-off sheet is charged and advanced to the exposure station 27. When the leading end of the sheet 18 actuates the switch S, the suction belt 25 stops, holding the sheet 18 at the exposure station 27. Upon depression of the switch S, the switch 64 closes to turn on the light source 4, which projects the image of the film through the projection lens 8 and mirrors 9, 10 onto the photosensitive sheet 18 at the exposure station 27.

After the exposure, the sheet 18 is advanced to the developing unit 29, in which the image is converted to a visible image. The sheet 18 is passed over the squeeze rollers 30 and then over the rollers 31 for absorbing excess liquid and discharged from the main body 1 through a front discharge outlet.

The mirror 11 thereafter returns to the solid-line position in FIG. 4. In timed relation therewith, the switch 64 which is opened on completion of the exposure is closed to turn on the light source 4 for the projection of the film image onto the screen 12.

Since the printing operation is performed after the handle has been so manipulated as to project images onto the screen at a constant intensity of illumination with a uniform illumination distribution, exposures made over the same period of time produce no irregularities on the copy images irrespective of the magnification of projection.

Figure 8:
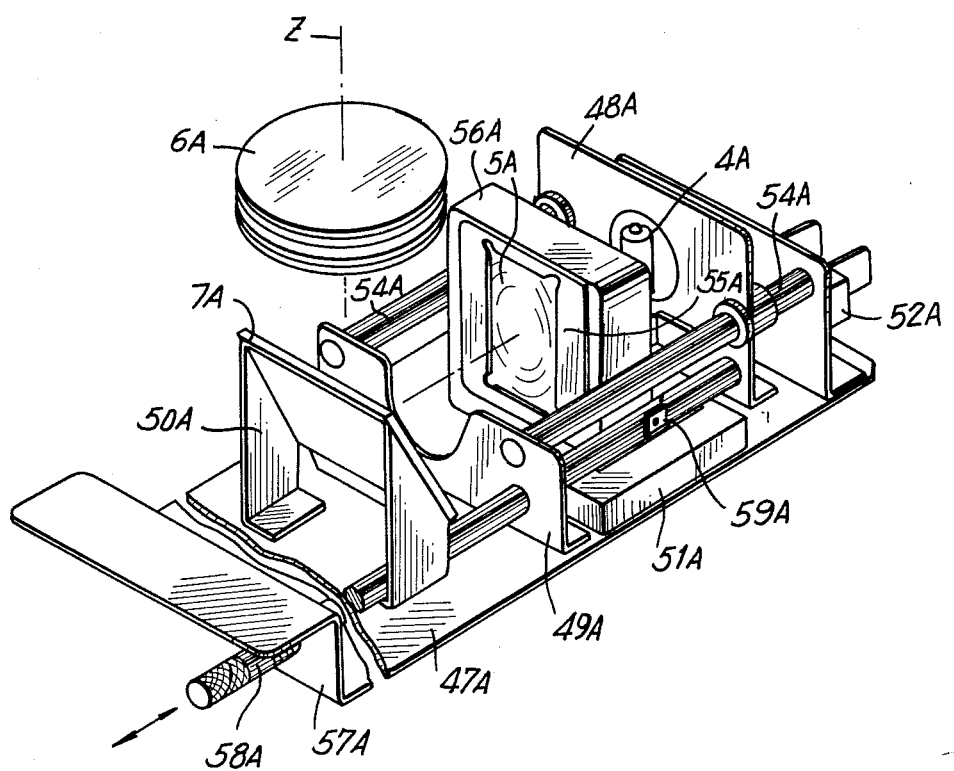
FIG. 8 is a perspective view of another illumination apparatus in accordance with the present invention.
Figure 9:
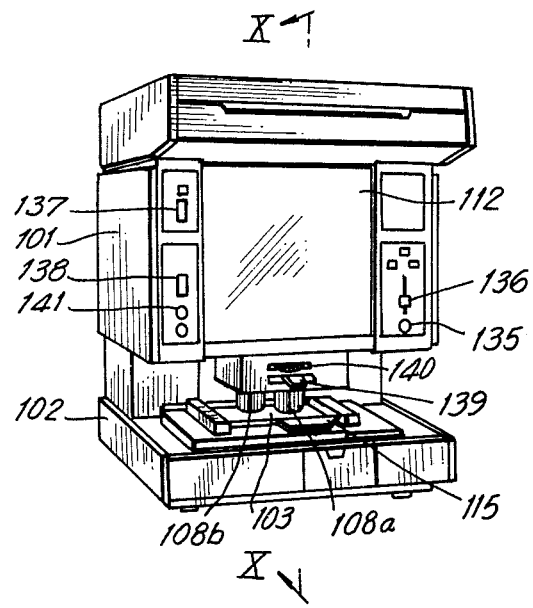
FIG. 9 is a perspective view of another reader-printer according to the present invention.

Although the condenser lenses are movable between the light source and the film in the embodiment described above, FIG. 8 shows another embodiment of the present invention which includes a fixed condenser lens group 5A and a light source 4A which is movable along the optical axis Z. The light source is shifted away from the film to illuminate the film over a small area at a high projection magnification or toward the film to illuminate the same over a large area at a low projection magnification. The two embodiments are of the same construction except that the light source or the condenser lens group is respectively movable, so that each component of FIG. 8 is referred to by the reference numeral as the corresponding part shown in FIG. 6, with the letter A attached thereto. The variable resistor 51A provides a higher and lower resistance as the handle 58A is respectively retracted or pulled and advanced.

Alternatively, both the light source and the condenser lens group may be made movable, such that they are moved away from each other at a high magnification or toward each other at a low magnification. This produces the same effect as when one of the light source and condenser lens group is rendered movable according to the magnification.

Although the foregoing embodiments use a plurality of interchangeable projection lenses, a variable projection magnification may be achieved by the use of a zoom lens or by altering the position of a lens and the conjugate distance.

According to the foregoing embodiments as adapted for use in a projection device having a projection lens for projecting the image of a subject illuminated by a light source and a condenser lens group, the illumination apparatus comprises means for shifting at least one of the light source and the condenser lens group along the optical axis and control means for varying the amount of light from the light source in operative relation to the movement of the light source or the lens group. Since the light source or the condenser lens group is so shifted as to provide a constant illumination and a uniform illumination distribution at the plane of the projected image irrespective of the magnification of the projection lens, the image can be projected at a constant intensity of illumination with a uniform illumination distribution regardless of the projection magnification of the lens, free of irregularities in the illumination or exposure.

Referring now to FIGS. 9 to 17 which illustrate another embodiment of the present invention as applied to a reader-printer, a fiche film F is held in a planar position by a carrier 103 which is movable forward or backward and sidewise on a base 102 of the main body 101.

A light source 104 illuminates the film F by means of groups of condenser lenses 105 and 106 and a mirror 107, and the projection lens 108 projects the image of the illuminated film via mirrors 109, 110 and 111 onto a screen 112 on the front side of the main body 101.

The carrier 103 comprises an upper glass plate 113 and a lower glass plate 114 carrying a knob 115. The upper glass plate 113 is attached to the lower glass plate 114 by an unillustrated hinge connection to permit the opening and closing of the carrier. During copying, the mirror 111 is turned to the broken line position in FIG. 10 about a pivot 116.

Figure 10:
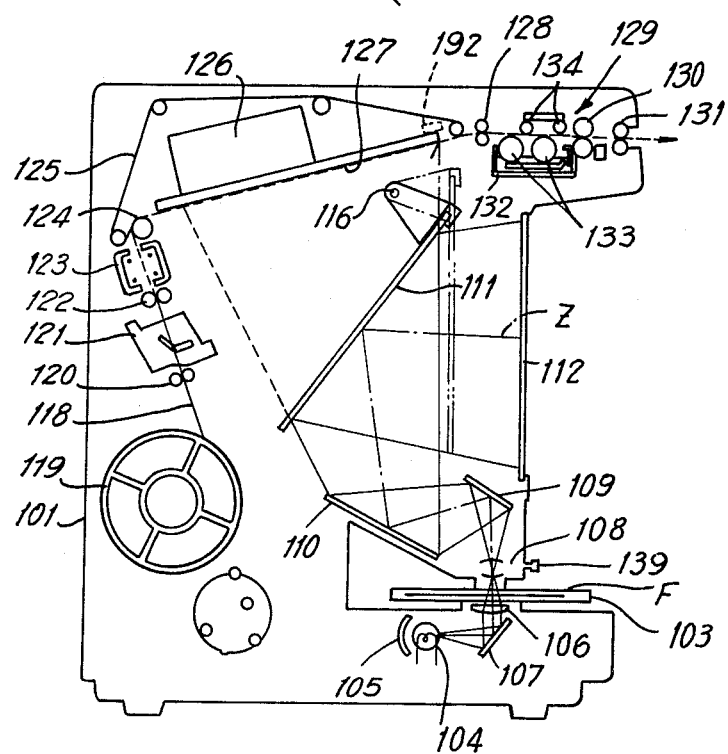
FIG. 10 is a sectional view taken along the line X—X in FIG. 9.

Photosensitive paper 118 is wound on a spool 119 and arranged along the path of transport of the paper 118. Indicated in part by broken line in FIG. 10 are a pair of feed rollers 120, a cutter 121, a pair of transport rollers 122, a charger 123, a pressure roller 124, a suction belt 125 and a suction unit 126. The paper 118 is exposed to light at an exposure station 127 defined by the portion of the suction belt 125 held in a planar position by the suction unit 126. Further arranged along the path of paper transport beyond the exposure station 127 are a pair of transport rollers 128, a developing unit 129, a pair of squeeze rollers 130 and a pair of absorbant rollers 131. The developing unit 129 comprises a developer container 132 filled with a developer, developing electrode lower rollers 133, 133 partly immersed in the developer and developing electrode upper rollers 134, 134 disposed above the rollers 133, 133.

The main body 101 is provided on the front thereof with a copy switch 135, an exposure control knob 136, a copy number setting dial 137, a copy size changing switch 138, a change-over lever 139 for interchanging projection lenses 108a, 108b, a focus adjusting ring 140 for the lens 108 which is in position for projection and a power supply switch 141.

Figure 11:
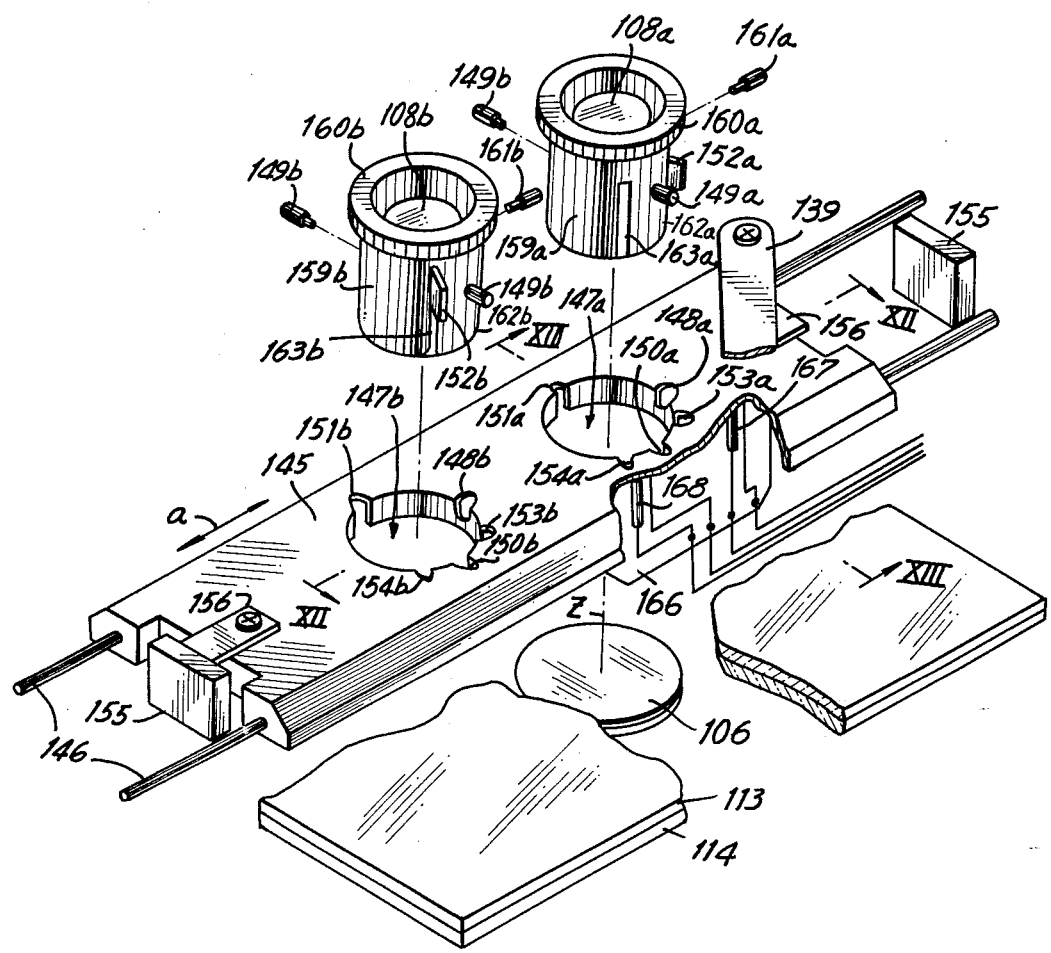
FIG. 11 is a partially fragmented and exploded perspective view of a projection lens shifting unit of the reader-printer of FIG. 9.

As seen in FIG. 11 which illustrates a portion of the apparatus proximate the projection lens, a lens support plate 145 is mounted on a pair of guide rails 146 fixed to the main body 101 and is slidable in the directions of arrows a in FIG. 11. The plate 145 is connected to a lens change-over lever 139 projecting forwardly from the front of the main body 101. Openings 147a and 147b for receiving the projection lenses 108a and 108b respectively are formed in the support plate 145 and are mutually spaced along the direction of movement of the plate 145. The inner peripheral borders of the plate 145 defining the openings 147a and 147b are formed with lens positioning cutouts or notches 148a and 148b respectively extending in the plate sliding direction. The peripheral border defining the opening 147a is formed with recesses 150a and 151a opposed to each other along an axis at a right angle to the plate sliding direction for accepting two corresponding slide pins 149a to be described later. Similarly the peripheral border defining the opening 147b has recesses 150b and 151b for accepting slide pins 149b. The openings 147a and 147b are further provided with apertures 153a and 154a, and 153b and 154b on opposite sides of the recesses 150a and 150b respectively for receiving magnets 152a and 152b therein.

The lens support plate 145 is provided, at its both longitudinal ends in the sliding direction of the plate with magnetic stop 156 and 156 for engagement with opposing magnets 155 fixed to the main body 101. The stops are adjustable in the plate sliding directions.

Figure 13:
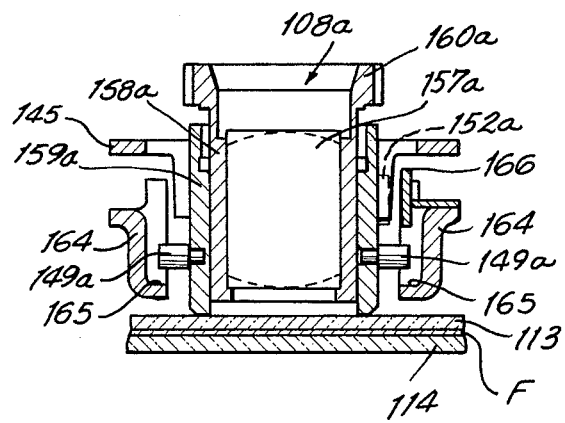
FIG. 13 is a sectional view taken along the line XIII—XIII in FIG. 11.

The projection lenses 108a and 108b are each constructed as shown in section in FIG. 13 which illustrates only the lens 108a. The lens 108a comprises a lens element or member 157a, an inner barrel 158a supporting the lens element 157a, an outer barrel 159a telescoped by the inner barrel 158a and in screw-thread engagement therewith and a gear 160a formed at the top of the inner barrel 158a. The outer barrel 159a is provided with a positioning pin 161a separably slidably engaging the notch 148a in the support plate 145 and with the two slide pins 149a extending in a direction at right angles to that of the pin 161a. On opposite sides of one slide pin 149a, the outer barrel 159a has longitudinal grooves 162a and 163a, the groove 162a engaging the magnet 152a. Since the projection lens 108b is of the same construction as the lens 108a, the components of the lens 108b are referred to by the same reference numerals as the corresponding parts of the lens 108a except that each suffix "a" is changed to "b." With the lens 108b, the magnet 152b is fitted in the groove 163b of the outer barrel 159b.

Figure 12:
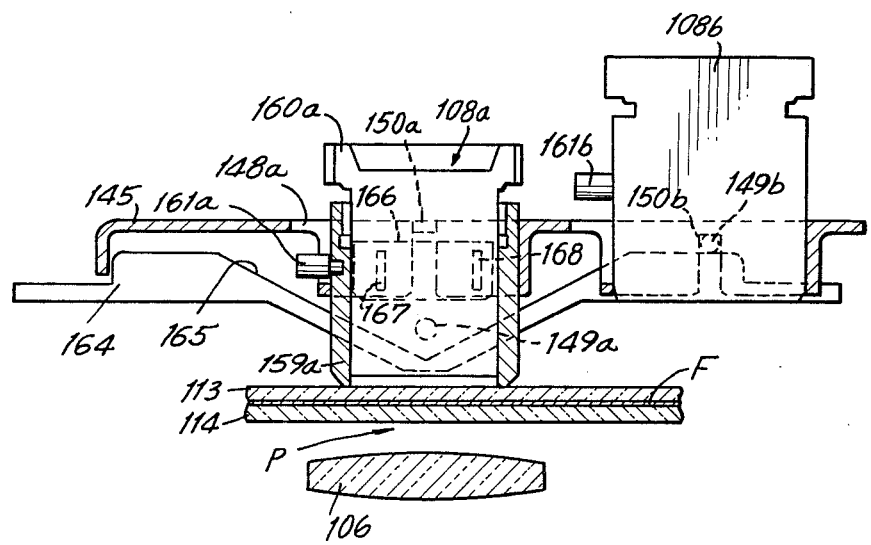
FIG. 12 is a sectional view taken along the line XII—XII in FIG. 11.

As seen in FIGS. 12 and 13, a pair of cam plates 164 engage the slide pins 149a and 149b on the projection lenses, extend along the direction of the sliding movement of the support plate 145, is positioned below the plate 145 and is fixed to the main body 101. Each of the cam plates 164 has a cam face 165 which is substantially V-shaped and is at the lowest level at the position of projection P, so that the slide pin 149a on the lens 108a is disposed above the cam face 165 when the outer barrel 159a of the lens 108a rests on the upper glass plate 113. When the lens 108a is moved from the position of projection P, the cam face 165 raises the slide pin 149a from below to raise the lens 108a out of contact with the upper glass plate 113.

At the position P where the cam face 165 is lowest, the cam plate 164 is provided with a holder 166 supporting reed switches 167 and 168 in proximity with the magnets 152a and 152b on the lenses 108a and 108b respectively. The reed switches 167 and 168 are connected in the circuit shown in FIG. 14.

In this circuit, each of the reed switches 167 and 168 has one end connected to an unillustrated power supply circuit and the other end divided into four terminals. A pair of the divided terminals 170 and 171, are connected respectively to inverters 172 and 173 which are connected to an AND circuit 174 whose output is connected to a control circuit 175.

Another pair of the divided terminals, 176 and 177, are connected to an AND circuit 179, with an inverter 178 provided between the terminal 176 and the circuit 179. The output of circuit 179 is connected to the control circuit 175.

A further pair of the divided terminals, 180 and 181, are connected directly to an AND circuit 182 whose output is connected to the control circuit 175. The remaining pair of the divided terminals, 183 and 184, are connected to an AND circuit 186 whose output in turn is connected to the control circuit 175, with an inverter 185 being provided between the terminal 184 and the circuit 186. The control circuit 175 comprises the phase control circuit of FIG. 15 and the timer circuit of FIG. 16. With reference to FIG. 15, the illumination device light source 104 is connected to an AC source through the output terminals of a Triac 188 having a gate connected to a unijunction transistor (hereinafter referred to as "UJT") 189. The emitter of the UJT is connected to four semi-fixed resistors R1, R2, R3, R4 by way of transistors Tr1, Tr2, Tr3, Tr4 connected at their bases to the output terminals of the AND circuits 174, 179, 182, 186 of FIG. 14 respectively. The positive terminal of the control circuit of FIG. 15 is connected to resistors R1, R2, R3 and R4 through a resistor to UJT 189 through a switch 190 which is closed only when the device is used as a reader and a contact pair 191 connected across switch 190 and which is closable by a relay RY to be described later.

Figure 16:
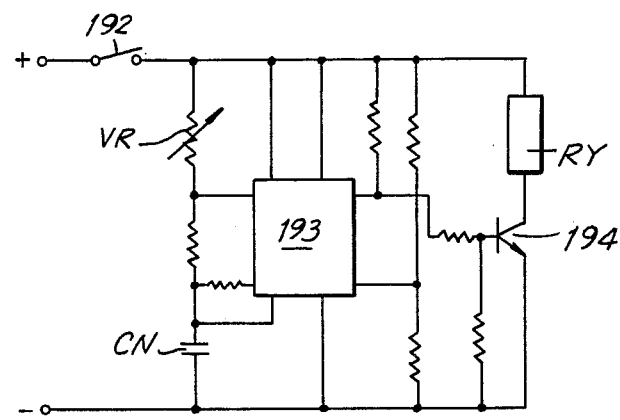
FIG. 16 is a detailed fragmentary diagram of the circuit of FIG. 14.

The timer circuit shown in FIG. 16 is energized for printing and is connected to a positive power supply terminal through a switch 192 which is closed when the photosensitive sheet 118 is brought to the exposure station 127. Provided between the positive terminal switch and a timer IC 193 is a variable resistor VR which is operated by the exposure control knob 136 on the front side of the main body 101. A capacitor CN for establishing a specified time constant is connected in series with the variable resistor VR. The above-mentioned relay RY is connected to the timer IC 193 through a switching transistor 194.

The reader-printer of the above construction operates in the following manner.

First, when the device is used as a reader, the power supply switch 141 is closed, with the switch 190 of FIG. 15 in its closed position. Since the projection lens 108a is in the position of projection P, one of the reed switches 167, 168, namely, the switch 167 is closed by the magnet 152a on the lens 108a. With the closing of the reed switch 167 only, the switch 167 provides high output and the switch 168 provides a low output, causing the AND circuit 186 alone to have a high output. This renders the transistor Tr4 only conductive, with the result that the UJT 189 is turned on when the voltage across the capacitor CO charged through the resistor R4 reaches a predetermined value. Consequently, current passes between the UJT bases to feed a pulse signal to the gate of the Triac 188. Depending on the pulse signal, the Triac 188 subjects the power from the AC power supply to phase control and supplies the resulting current to the light source 104 to control the brightness or intensity of the light source 104.

The light source 104 thus energized, illuminates, through the mirror 107 and the group of condenser lenses 106, the subject on the film F movably supported on the carrier 103 comprising the upper and lower glass plates 113 and 114. The illuminated image is projected onto the screen 112 by means of the projection lens 108a and the mirrors 109, 110 and 111. If the projected image is obscure, the focus adjusting ring 140 is turned, whereby to turn the gear 160a of the lens 108a. The inner barrel 158a integral with the gear is thereby turned and moved upward or downward relative to the outer barrel 159a in contact with the upper glass plate 113, altering the distance between the lens element 157a and the film for focus adjustment.

When the projected image is to be printed, the resistance of the variable resistor VR is adjusted by moving the exposure control knob 136 on the front side of the main body 101 to obtain the desired print density. The dial 137 is set to the desired number of prints, and the switch 138 to the desired size of photosensitive paper 118.

Subsequently the copy switch 135 is turned on, whereupon the switch 190 is opened to temporarily deenergize the light source 104 and cause an unillustrated means to shift the mirror 111 to the broken position of FIG. 10, whereat it blocks passage of light into the device through the screen 112. The photosensitive paper 118 is then fed from the spool 119, cut to the desired size, charged and positioned at the exposure station 127. When the leading end of the cut-off sheet 118 depresses the switch 192, the suction belt 125 stops, bringing the sheet 118 to a halt at the exposure station 127. The depression of the switch 192 energizes the timer IC 193 and the relay RY in FIG. 16 and closes the contact 191. The light source 104 is thus energized under the control of the resistor R4, UJT 189 and Triac 188. With the lighting of the light source 104, the image of the film is projected onto the sheet 118 at the exposure station 127 by means of the projection lens 108a and mirrors 109 and 110. The exposure time is determined by the time constant of the variable resistor VR and capacitor CN in FIG. 16, such that when the potential across the capacitor CN reaches a predetermined value, the timer IC 193 renders the transistor 194 non-conductive to deenergize the relay RY and open the contact 191, thus extinguishing the light source 104.

After the exposure, the image on the sheet 118 is converted to a visible image by the developing unit 129. The sheet is then passed over the squeeze rollers 130 and absorbant rollers 131 for drying and discharged from the reader-printer main body 101 through an outlet in its front side.

The mirror 111 is thereafter returned to the solid-line position in FIG. 10. Simultaneously with this, the switch 190 is closed to again energize the light source 104 and project the film image onto the screen 112.

The projection magnification is changed by bringing the projection lens 108b to the position of projection P, by manipulating the change-over lever on the front side of the main body 101. The change-over lever 139, when moved to the right as viewed in FIG. 9, moves the lens support plate 145 also rightward as viewed in FIG. 11 along the pair of guide rails 146. With this movement of the support plate 145, the projection lens 108a is moved leftward as viewed in FIG. 12 away from the projection position P, while being raised from the upper glass plate 113 by its slide pins 149a being raised by the V-shaped cam faces 165 of the pair of cams 164 in contact therewith.

On the other hand, the projection lens 108b, offset from the position P and retained above the upper glass plate 113 by horizontal portions of the cam faces 165, is moved leftward as viewed in FIG. 12, by the movement of the lens support plate 145. With this movement, the slide pins 149b on the lens 108b descend along the cam faces 165, allowing the outer barrel 159b of the lens 108b to come into contact with the upper glass plate 133, whereby the lens 108b is positioned on the glass plate 113. The support plate 145 is then stopped by the engagement by the stop 156 thereon with the magnet 155. The projection lens 108b is positioned in the projection position P with its outer barrel 159b in contact with the upper glass plate 113.

The change of the projection lens opens the reed switch 167 and causes the magnet 152b on the lens 108b to close the reed switch 168. With reference to the circuits of FIGS. 14 to 16, the switches 167, 168 thus opened and closed permit the AND circuit 179 to produce high output, which renders the transistor Tr2 conductive. Consequently, the UJT 189 and Triac 188 function to control the power supply to the light source 104 in accordance with the value of the resistor R2. By way of the projection lens 108b and the mirrors 109, 110 and 111, the image of the film illuminated the light source 104 is projected onto the screen 112.

The resistor R2 is so adjusted that the film image thus projected has the same illumination as when it is projected through the projection lens 108a. This serves to eliminate variations in the illumination of the images projected on the screen 112 and prevents fatigue of the operator's eyes despite the change of the lens 108a to the lens 108b.

Since a constant illumination is also achieved at the exposure station 127 for printing, there is no need to move the exposure control knob 136 with a change of the projection lens.

The present device is usable with two other kinds of projection lenses: one having no magnet and the other having two magnets. Thus, four kinds of projection lenses are mountable on the lens support plate 145 in six different combinations. In the case of the lens with no magnet, the reed switches 167, 168 remain open and provide low outputs, which, through the two inverters 172, 173, causes the AND circuit 174 alone to produce a high output and render the transistor Tr1 conductive. Consequently, the UJT 189 and the Triac 188 function to control the power supply to the light source 104 in accordance with the value of the resistor R1. With the projection lens having two magnets, the reed switches 167, 168 are closed, causing the AND circuit 182 alone to produce a high output. The transistor Tr3 therefore conducts, causing the resistor R3 to control the power supply to the light source 104 through the UJT 189 and the Triac 188.

Figure 17:
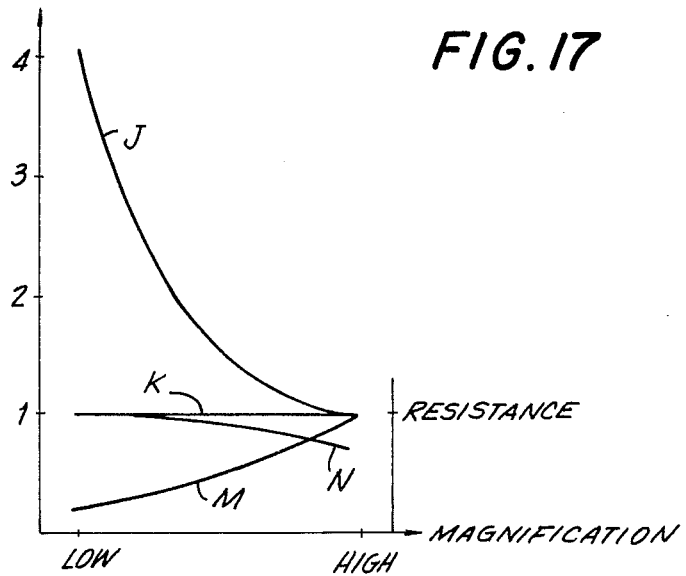
FIG. 17 is a diagram showing the relationship between the projection magnification and the illumination ratio of a screen.

The resistors R1, R2, R3 and R4 are adjusted in the manner hereinafter described below with reference to FIG. 17. As seen in FIG. 17, a curve J represents the relation between the magnification of projection and the illumination at the screen or focal plane surface 112 established with the use of projection lenses 108 of the same f-number, with a constant power supply to the light source 104 to illuminate the film F at a constant intensity. It is seen that the lower the magnification, the higher is the illumination of the screen surface.

The illumination at the screen surface can be made constant irrespective of the magnification as represented by a line K by reducing the brightness of the light source 104 with the decrease of the magnification as indicated by a curve M. The brightness of the light source 104 can be varied as shown by the curve M by altering the power supplied to the light source 104. The power supply is variable by varying the charge-discharge cycle of the capacitor CO in FIG. 15, namely, by varying the resistance of the semi-fixed resistors R1, R2, R3 and R4 along a curve N in FIG. 17. Thus, the resistors R1 to R4 each need to be adjusted in accordance with the magnification of the corresponding projection lens 108 so as to provide a lower resistance with an increase in the magnification.

Since FIG. 17 is a schematic diagram which is not always accurately indicative of the actual relation, for example, because the f-number may actually differ from lens to lens, it is preferable to adjust the semi-fixed resistors in accordance with the measurements of the illumination of the screen surface 112.

In this way, the power supply to the light source 104, namely the brightness of the light source 104 is controllable by the resistors R1 to R4 for the respective projection lenses. Consequently, images can be projected onto the screen 112 at a constant intensity of illumination by the adjustment of the resistors R1 to R4.

Since a constant illumination is also maintained for printing at the exposure station 127 independently of the variations of the magnification, there is no need to adjust the amount of exposure by the knob 136 when the projection lens is changed.

Although the circuit of the embodiment is so adapted that a constant illumination is maintained on the screen 112 and also at the exposure station irrespective of the magnification of projection, another embodiment will be described below in which the exposure station 127 is adapted to receive a constant amount of exposure, whereas the illumination of the screen 112, as well as of the exposure station 127, varies with the magnification of projection.

The embodiment, except for its circuit, has the same construction as that of FIGS. 9 to 17, and will therefore be described with reference to the construction shown in FIGS. 9 to 13.

Figure 18:
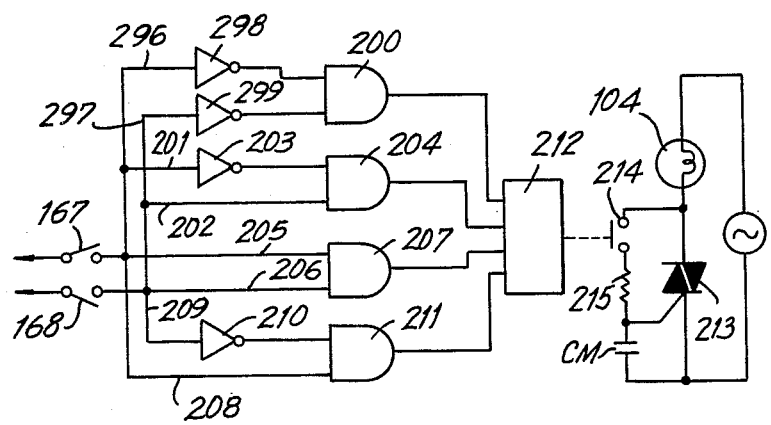
FIG. 18 is a view similar to FIG. 14 of another control network.

Referring to FIG. 18 which is an overall circuit diagram, reed switches 167, 168, like those of the network of FIG. 14, each have one end connected to the power supply circuit and the other end divided into four terminals. A pair of the terminals, 296 and 297, are connected respectively to inverters 289, 299 which are connected to an AND circuit 200. Another pair of the divided terminals, 201 and 202, are connected to an AND circuit 204 with an inverter 203 provided between the terminal 201 and the AND circuit 204. Another pair of the terminals, 205 and 206, are connected directly to an AND circuit 207. The last pair of the terminals, 208 and 209, are connected to an AND circuit 211 with an inverter 210 provided between the terminal 209 and the circuit 211. The output terminals of the AND circuits 200, 204, 207 and 211 are connected to a control circuit 212. A light source 104 is connected via a Triac 213 to an AC power supply. The contact 214 of a relay RY' to be hereinafter described and a resistor 215 are connected between the anode and gate of the Triac 213, with a capacitor CM being connected between the Triac gate and cathode, such that full power is applied to the light source 104 when the contact 214 is closed.

Figure 19:
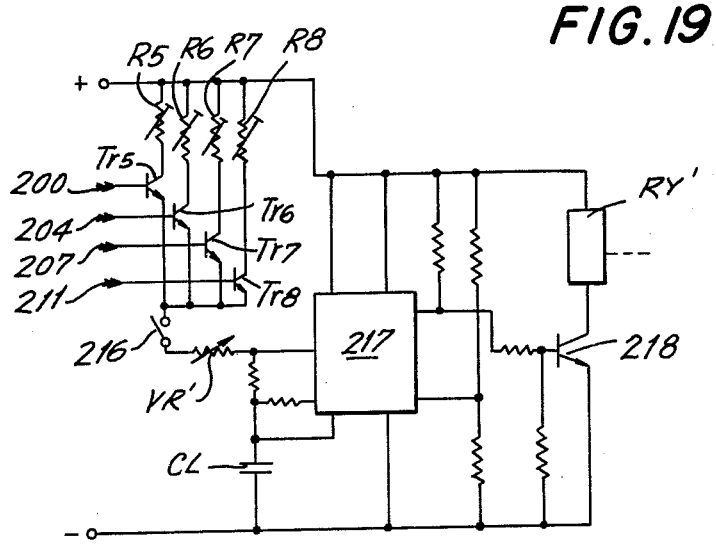
FIG. 19 is a detailed fragmentary diagram of the circuit of FIG. 18.

As seen in FIG. 19, the control circuit 212 has four semi-fixed resistors R5, R6, R7 and R8 connected to a power supply positive terminal. These resistors are connected to one terminal of a switch 216 by way of respective transistors Tr5, Tr6, Tr7 and Tr8 whose bases are connected to the outputs of AND circuits 200, 204, 207 and 211, respectively. The switch 216 is closed when the device is used as a printer, but is opened when it is used as a reader. The other terminal of the switch is connected to one terminal of a variable resistor VR' which is manipulated with an exposure control knob 136 on the front side of the main body 101. The resistor VR' is connected at its other terminal to a timer IC 217 and through a capacitor CL to the power supply negative terminal for providing a predetermined time constant. The relay RY' is controlled by the timer IC 217 through a switching transistor 218.

The circuit last described operates in the following manner: When the device is used as a reader, the switch 216 is left open, so that the circuit operates without being influenced by the projection lens 108, with no charge being applied to the capacitor CL. Consequently, the timer IC 217 holds the transistor 218 in a conductive condition, keeping the relay RY' energized to maintain the contact 214 in its closed position, whereby a full power is supplied to the light source 104 at all times. A bright image of the film F is therefore projected onto the screen 112. However, change of the projection lens 108 produces a variation in the illumination of the screen 112.

For a printing operation, the switch 216 is closed simultaneously with lighting of the light source 104. The capacitor CL is therefore charged through one of the four resistors, R5, R6, R7, R8 and through the variable resistor VR'. When the voltage across the capacitor CL reaches a predetermined value, the timer IC 217 brings the transistor 218 out of operation, deenergizing the relay RY' to open the contact 214 and turn off the light source 104.

One of the resistors R5 to R8 selectively operates in the same manner as earlier described with reference to FIGS. 14 and 15 to control the current to the capacitor CL along with the variable resistor VR'. Each of the semi-fixed resistors R5 to R8 is adjusted for the corresponding projection lens 108 based on the measurements of the illumination over the exposure station 127 or screen 112 so as to afford the desired amount of exposure.

When the resistors are so adjusted, the exposure station 127 is given a constant amount of exposure which produces copy images with a constant density although the change of the projection lens 108 alters the illumination of the screen surface 112.

Figure 20:
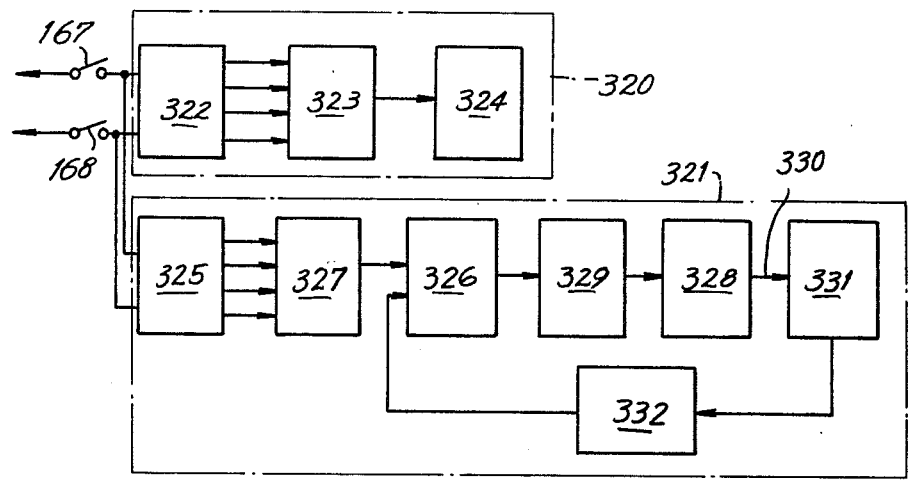
FIG. 20 is a block diagram of another control network.
Figure 21:
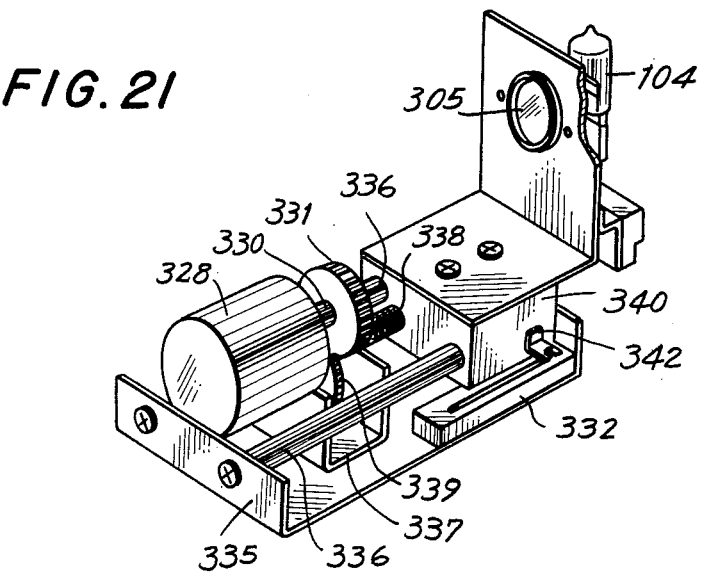
FIG. 21 is a perspective view of the illumination apparatus moved by the circuit of FIG. 20.

With the embodiments of FIGS. 9 to 19, the illumination over the screen 112 and the exposure station 127 or the amount of exposure for the exposure station is kept constant independently of the change of the projection lens, whereas the following embodiment illustrated in FIGS. 20 and 21, having the same construction as the earlier embodiments, further incorporates an expedient for correcting the irregularities of illumination on the screen 112 or the exposure station 127.

Referring now to FIGS. 20 and 21, when the film F is uniformly illuminated, the image projected onto the screen 112 has an illumination which is generally represented by the curve A in FIG. 1 at a low magnification or by the curve B at a high magnification. Accordingly, the illumination can be corrected by varying the power supply to the light source 104 as in the embodiments of FIGS. 9 to 17. Mere variations of the power supply nevertheless involve power losses; it appears useful to alter the distance between the condenser lenses 106 and the light source 104 in accordance with the related projection magnification.

With the present embodiment, the light source 104 is made shiftable, such that the light source 104 is moved toward the condenser lenses 106 for a low magnification, but away from the lenses for a high magnification. This arrangement will be described more specifically with reference to the block diagram of FIG. 20.

Reed switches 167, 168 each have one end divided into two terminals; one connected to an exposure control circuit 320 and the other connected to a light source shifting circuit 321. The exposure control circuit 320 comprises a logic circuit 322 which, like the circuit of FIG. 14, includes inverters and AND circuits, a control circuit 323 equivalent to that of FIGS. 15 and 16, and an output circuit 324 and functions to control the power supply to the light source 104.

The shifting circuit 321 comprises a logic circuit 325 equivalent to the logic circuit 322 of the exposure control circuit 320, a reference signal generator 327 for selecting one of the input signals from the logic circuit 325 and feeding a reference signal to a comparator circuit 326 in accordance with the selected input signal, a switching circuit 329 for changing the direction of rotation of a motor 328 in accordance with the output of the comparator circuit 326, and a potentiometer 332 operable by the rotation of a gear 331 on the output shaft 330 of the motor 328 and connected to the comparator circuit 326.

The assembly for shifting the light source 104 is shown in FIG. 21 and includes a frame 335 secured to the reader-printer main body 101 and provided with a pair of transversely spaced longitudinal guide rails 336 and the motor 328. The gear 331 mounted on the output shaft 330 of the motor 328 meshes with a gear 339 rotatably supported on an auxiliary frame 337 fixed to the frame 335. The gear 339 is integral with a longitudinally extending screw 338.

The guide rails 336 longitudinally slidably support a slide member 340 in follower thread engagement with the screw 338 and moved along the guide rails 336 by the rotation of the screw 338. The slide member 340 fixedly carries the light source 104 and a mirror 305 therefor and has a finger 342 in engagement with the movable element of potentiometer 332 which is mounted on the frame 335 and extends along the direction of movement of the slide member 340.

The projection lens 108 in the position of projection, P, turns the reed switches 167 and 168 on or off. The resulting signal energizes the logic circuit 325 of the shifting circuit 321, causing the reference signal generator 327 to check whether the projection lens 108 in the position P has a low magnification or high magnification and to feed to the comparator circuit 326 an output signal corresponding to the magnification detected. The comparator circuit compares the input from the signal generator 327 and the input from the potentiometer 332 for detecting the position of the slide member 340 carrying the light source 104 to check whether or not the light source 104 is in the position corresponding to the magnification of the projection lens 108.

If the light source 104 is in the proper position, the comparator circuit 326 provides no output, leaving the motor 328 deenergized and dormant. The slide member 340 will therefore not move, retaining the light source 104 in position. However, if the light source 104 is not in the proper position for the selected projection lens 108 of a particular magnification, the input to the comparator 326 from the generator 327 differs from that from the potentiometer 332, with the result that the comparator circuit 326 feeds the switching circuit 329 an output corresponding to the positive or negative input difference. The switching circuit 329 changes the direction of rotation of the motor 328 depending on whether the output of the comparator circuit 326 is positive or negative and drives the motor 328 in a corresponding direction. With the rotation of the motor 328, the output shaft 330 rotates the gears 331 and 339 and the screw 338, moving the slide member 340 along the guide rails 336. The member 340 moves the light source 104 therewith and causes the pawl 342 to operate the potentiometer 332, consequently, varying the output of the potentiometer 332 with the shift of the slide member 340. Upon the shift of the slide member 340 and the light source 104 to the proper position corresponding to the magnification of the projection lens 108, the potentiometer 332 feeds to the comparator circuit 326 input a signal matching the output of the signal generator 327. With no output produced from the comparator circuit 326, the motor 328 stops, bringing the light source 104 to a halt in the proper position for the lens 108. This position is determined by presetting the output from the reference signal generator 327 for the magnification of the projection lens 108 used.

On the other hand, the ON-OFF signal from the reed switches 167, 168 is applied also to the logic circuit 322 of the exposure control circuit 320, which controls the power supply to the light source 104 by way of the control circuit 323 and the output circuit 324. The exposure control circuit 320, which is similar or equivalent to the circuit of FIGS. 14 to 16, requires no explanation. However, it is to be noted that with use of a projection lens 108 of high magnification, the correction of the illumination of the screen 112, namely, the correction of the brightness of the light source 104 is smaller and the required increase of the power supplied to the light source 104 is less when the light source 104 is moved (FIG. 1, curve I) than when the light source 104 is not moved (FIG. 1, curve B).

Thus, when the light source 104 is shifted in accordance with the magnification of the projection lens 108 in such manner that the lens 108 is moved away from the condenser lenses 106 for a high magnification and is moved toward the lenses 106 for a low magnification, and further when the power supply to the light source 104 is varied, it is possible to maintain a uniform or constant illumination ratio between the center and the peripheral portion of the screen 112 or of the exposure station 127 and to keep illumination and the amount of exposure constant, regardless of the magnification of the projection lens 108.

While the shift of the light source 104 in accordance with the magnification of the projection lens 108 is thus useful, the same effects can be achieved by shifting the condenser lenses 106 or both the light source 104 and the condenser lenses 106.

Further, it is possible to turn on the light source 104 for a controlled period of time by the exposure control circuit 320 with a constant power supply to the light source 104 as shown in FIGS. 17 and 18.

Although the lens support plate of the above embodiments is adapted to support two of the four kinds of projections lenses, one projection lens may be detachably mounted on the support plate to provide a variable magnification by selectively using one of the lenses.

It is also possible to use a larger number of projection lenses with the use of a larger number of detecting members such as reed switches or hole elements.

With reference to FIGS. 22 to 25, another embodiment of the invention will be described which is characterized in that a group of condenser lenses 405 is movable in accordance with the magnification of projection by operating a switch SW provided on the front side of the main body 401 and that the power supply to the light source 404 is variable with the movement of the lenses.

Figure 22:
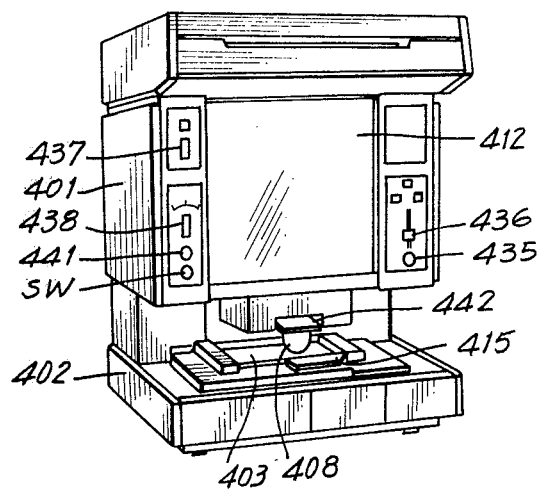
FIG. 22 is a perspective view of another reader-printer according to the present invention.
Figure 23:
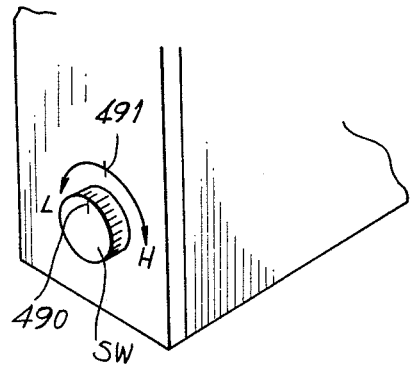
FIG. 23 is a fragmentary enlarged view of FIG. 22.
Figure 24:
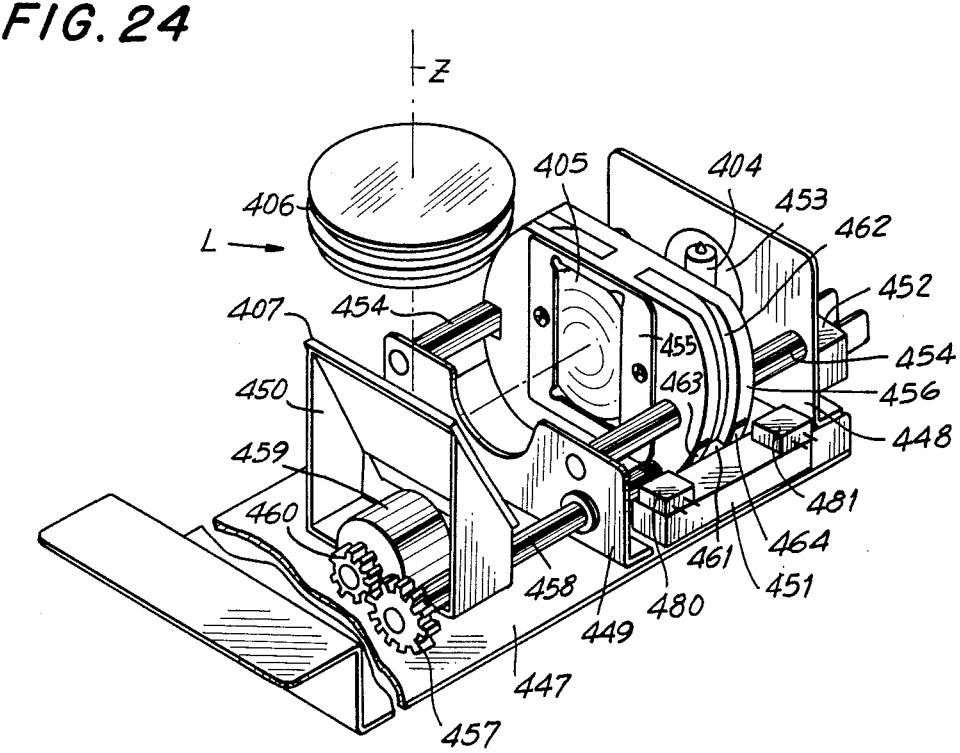
FIG. 24 is a perspective view showing the illumination apparatus of the device of FIG. 22.

The reader-printer illustrated in FIG. 22 is equivalent to that of FIGS. 3, 4 and 5 in construction and operation with the exception of the switch SW on the front side of the main body 401 (FIG. 23) and an illumination unit L having the construction of FIG. 24. Accordingly, the same members as shown in FIGS. 3 to 5 are referred to by the same numerals plus 400.

As shown in FIGS. 23 and 24, the switch SW is a double switch which opens when a mark 490 thereon automatically returns to the center position 491 shown in FIG. 23.

The illumination apparatus L shown in FIG. 24 is housed in the base 402 of the reader-printer, and has a frame 447 fixed to the base 402. The frame 447 is provided with two upright brackets 448 and 449, a holder 450 holding a mirror 407 and a longitudinal variable resistor 451 having two normally closed reed switches 480 and 481 on opposite ends thereof. The bracket 448 is provided with the light source 404, a plug 452 for the light source 404 and a spherical reflecting mirror 453. A pair of longitudinal slide rods 454 extends between the brackets 448 and 449. A movable member 456 carrying the condenser lens group 405 which is secured thereto by a holder 455 is mounted on the slide rods 454 and is movable axially thereof. A rod 458 rotatably extending through the bracket 449 is in screw-thread engagement with the movable member 456. The rod 458, when rotated, moves the movable member 456 along the slide rods. The rod 458 has a gear 457 meshing with a drive gear 460 on a motor 459 mounted on the frame 447.

The movable member 456 has a groove 462 which engages a longitudinally movable adjustment knob 461 for the variable resistor 451. The movable member 456 further has magnets 463 and 464 for operating the reed switches 480 and 481, respectively. The magnet 464 opens the reed switch 481 when the movable member 456 is moved to its rightward position as viewed in FIG. 24, while the magnet 463 opens the reed switch 480 when the movable member 456 is moved to its leftward position as viewed in FIG. 24.

Figure 25:
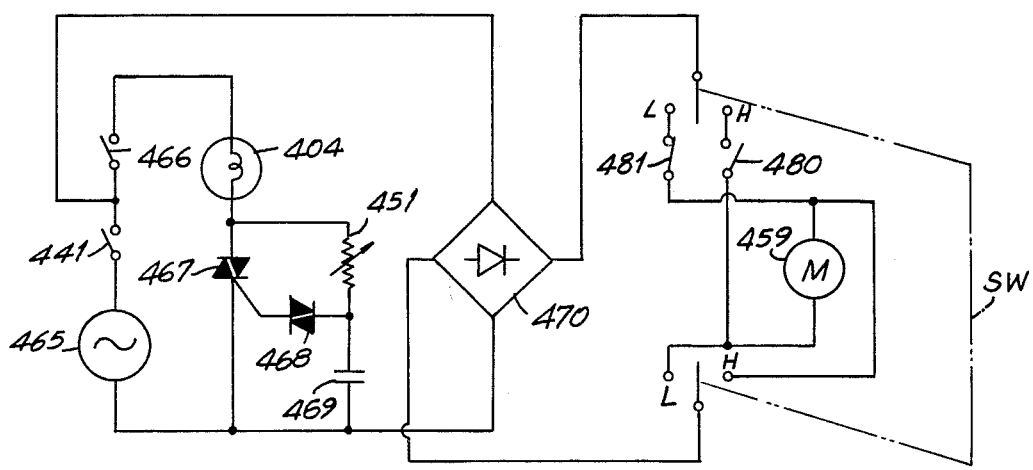
FIG. 25 is a diagram showing the control circuit of the illumination apparatus of FIG. 24.

With reference to FIG. 25, which illustrates the electric circuit for the illumination apparatus L of FIG. 24, the light source 404 and a Triac 467 are connected in series across an AC power supply 465, a series connected power supply switch 441 and exposure switch 466. A Diac 468 and a capacitor 469 are series connected between the cathode and gate of the Triac 467, and the variable resistor 451 is connected between the anode of the Triac 467 and the Diac 468. A rectifier 470 has its input connected to the AC power supply 465 by way of the power supply switch 441. The DC output of the rectifier 470 is applied to the motor 459 through the double, double throw switch SW and the reed switches 480 and 481, as shown in the circuit diagram.

The reader-printer operates in the same manner as the embodiment of FIGS. 3 to 7 for use as a reader and as a printer, so that the operation of the illumination apparatus L at varying magnification only will be described.

For projection at a low magnification, the switch SW is turned toward "L" as viewed in FIG. 23 to bring the condenser lenses 405 toward the light source 405, whereby the contacts of the switch SW are closed at L in FIG. 25. This energizes the motor 459 through the reed switch 481 for rotation, driving the rod 458 which in turn moves the movable member 456 rightward in FIG. 24. With the movement of the member 456, the condenser lenses 405 approach the light source 404 to uniformly illuminate the subject E over a wide area as shown in FIG. 1. The movement of the member 456 also increases the resistance of the variable resistor 451 and reduces the power supplied to the light source 404.

When the movable member 456 is moved rightward in FIG. 24, causing the magnet 464 to turn off the reed switch 481, the motor 459 is deenergized to stop the member 456.

For projection at a high magnification, the switch SW is turned toward "H" as viewed in FIG. 23 to drive the motor 459 through the reed switch 480 in a direction opposite to the direction in which it is driven when the switch SW is turned toward "L." The movable member 456 therefore moves leftward in FIG. 24, moving the condenser lenses 405 away from the light source 404 to concentrically illuminate the subject E over only a portion thereof. The movement of the movable member 456 reduces the resistance of the variable resistor 451 and increases the power supplied to the light source 404.

When the magnet 463 opens the reed switch 480 with the full leftward travel of the movable member 456 as viewed in FIG. 24, the motor 459 is deenergized to stop the movable member 456.

Since the mark 490 returns to the center position 491 and the motor 459 stops upon the manual release of the switch SW, the movable member 456 can be stopped at the proper position suited to the desired magnification of projection. The best position for the movable member 456 in accordance with the magnification of projection is the position where the illumination difference between the center and the peripheral portion of the screen 412 is smallest. Accordingly, if the variable resistor 451 is so designed that a constant illumination is available at the best position for each magnification, a constant illumination and a uniform illumination distribution can be maintained on the screen 412 or at the exposure station (not shown) irrespective of the magnification of projection.

While there have been described and illustrated preferred embodiments of the present invention, it is apparent that numerous alterations, additions and omissions may be made without departing from the spirit thereof.

What is claimed is:

1. An illumination control apparatus for a device which projects an image of an object at a variable magnification onto a projection plane, said apparatus comprising:
   a light source for illuminating the object;
   condenser lens means positioned between the light source and the object for condensing light from said source onto the object;
   means for supporting at least either the light source or the condenser lens means for movement along an optical axis of the condenser lens means so as to vary the distance between the light source and the condenser lens means;
   means for adjusting the power supplied to the light source; and
   means for interdependently controlling said power adjusting means and said distance between said light source and said condenser lens means.

2. An illumination control apparatus as claimed in claim 1, wherein the condenser lens means is movable along the optical axis thereof and is moved in accordance with said variable magnification.

3. An illumination control apparatus as claimed in claim 2, wherein the control means includes a variable resistor for varying said power by varying the resistance of said resistor in accordance with the movement of the condenser lens means.

4. An illumination control apparatus as claimed in claim 3, wherein the adjusting means includes a phase controlled member whose conduction angle is varied by the variable resistor so as to control the power supplied to the light source.

5. An illumination control apparatus as claimed in claim 1, wherein the light source is movable along the optical axis of the condenser lens means and is moved in accordance with the variation of the magnification.

6. An illumination control apparatus as claimed in claim 5, wherein the control means includes a variable resistor for varying said power by varying the resistance of said resistor in accordance with the movement of the light source.

7. An illumination control apparatus as claimed in claim 6, wherein the adjusting means includes a phase controlled member whose conduction angle is varied by the variable resistor so as to control the power supplied to the light source.

8. An illumination control apparatus for a device which projects an image of an object at a variable magnification onto a projection plane, said apparatus comprising:
   a light source for illuminating the object;
   condenser lens means provided between the light source and the object for condensing the light from said light source onto the object;
   means for supporting the condenser lens means for movement along the optical axis of the condenser lens means in accordance with said magnification variation so as to vary the distance between the light source and the condenser lens means;
   means for controlling power supplied from a power source to the light source, the control means including a variable resistor for varying the power in accordance with the resistance of the resistor; and
   means for intercoupling the variable resistor of the control means and the condenser lens means so as to control the power supplied to the light source in accordance with the movement of the condenser lens means.

9. An illumination control apparatus for a device which projects an image of an object at a variable magnification onto a projection plane, said apparatus comprising:
   a light source for illuminating the object;
   condenser lens means provided between the light source and the object for condensing light from said light source onto the object;
   means for supporting the light source for movement along the optical axis of the condenser lens means in accordance with the magnification variation so as to vary the distance between the light source and the condenser lens means;
   means for controlling the power supplied from a power source to the light source, the control means including a variable resistor for varying the power in accordance with the resistance of said resistor; and
   means for intercoupling the variable resistor of the control means and the light source so as to control the power supplied to the light source in accordance with the movement of the light source.

10. An illumination control apparatus for a device which projects an image of an object onto a projection plane, said apparatus comprising:
    a light source for illuminating the object;
    condenser lens means provided between the light source and the object for condensing light from the light source onto the object;
    means for projecting an image of the object onto the projection plane at a variable magnification;
    detecting means for detecting the magnification of the projecting means;
    means for moving at least the light source or the condenser lens means along the optical axis of the condenser lens means in response to the detecting means so as to vary the distance between the light source and the condenser lens means;
    means for controlling the power supplied to the light source from a power source; and
    means for coupling the control means to the light source or the condenser lens means so as to control the power supplied to the light source through the control means in accordance with the movement of the light source or the condenser lens means moved by the moving means whereby the illumination and a distribution of the illumination at the projection plane are held constant irrespective of the magnification of the projection means.

11. An illumination control apparatus as claimed in claim 10, wherein the condenser lens means is movable along the optical axis thereof and is moved by the moving means in accordance with a variation in said magnification.

12. An illumination control apparatus as claimed in claim 11, wherein the control means includes a variable resistor for varying the power supplied to the light source by varying the resistance of the resistor in accordance with the movement of the condenser lens means coupled to the control means through the coupling means.

13. An illumination control apparatus as claimed in claim 12, wherein the control means includes a phase controlled member whose conduction angle is responsive to the resistance of the variable resistor so as to control the power supplied to the light source.

14. An illumination control apparatus as claimed in claim 10, wherein the light source is provided movably along the optical axis of the condenser lens means and is moved by the moving means in accordance with a variation in said magnification.

15. An illumination control apparatus as claimed in claim 14, wherein the control means includes a variable resistor for varying the power supplied to the light source by varying the resistance of the resistor in accordance with the movement of the light source coupled with the control means through the coupling means.

16. An illumination control apparatus as claimed in claim 15, wherein the control means includes a phase controlled member whose conduction angle is responsive to the resistance of the variable resistor so as to control the power supplied to the light source.

17. An illumination control apparatus for a device which projects an image of an object onto a projection plane, said apparatus comprising:
    a light source for illuminating the object;
    condenser lens means movably provided between the light source and the object for condensing light from the light source onto the object;
    means for projecting an image of the object onto the projection plane at a variable magnification;
    means for detecting the magnification of the projecting means;
    means for moving the condenser lens means along its optical axis in response to the detecting means so as to vary the distance between the light source and the condenser lens means;
    control means including a variable resistor for controlling the power supplied from a power source to the light source in accordance with the resistance of the variable resistor; and
    means for coupling the variable resistor with the condenser lens means so as to vary the resistance of the variable resistor in accordance with the movement of the condenser lens means whereby the illumination and a distribution of the illumination at the projection plane are held constant irrespective of the magnification of the projecting means.

18. An illumination control apparatus for a projection device which projects an image of an object onto a projection plane, said apparatus comprising:
a movable light source for illuminating the object;
condenser lens means located between the light source and the object for condensing light from the light source onto the object;
means for projecting an image of the object onto the projection plane at a variable magnification;
means for detecting the magnification of the projecting means;
means for moving the light source along the optical axis of the condenser lens means in response to the detecting means so as to vary the distance between the light source and the condenser lens means;
control means including a variable resistor for controlling the power supplied from a power source to the light source in accordance with the resistance of the variable resistor; and
means for coupling the variable resistor with the light source so as to vary the resistance of the variable resistor in accordance with the movement of the light source whereby the illumination and distribution of the illumination at the projection plane are held constant irrespective of the magnification of the projecting means.

19. An optical projector including an object illuminating apparatus, comprising a light source, a condenser lens member positioned forwardly of said light source along the axis of the path of light therefrom to said condenser lens member and control means for interdependently varying the intensity of the light from said light source and the distance between said light source and said condenser lens member.

20. The optical projector of claim 19, including a lens system of variable magnification for projecting an image of said object, said control means being responsive to the magnification of said lens system.

21. The optical projector of claim 20, wherein said lens system comprises a plurality of projector lenses of different magnification and means for positioning a selected lens in an operative projecting position in the projector, said control means being responsive to said positioning means.

22. The optical projector of claim 19, wherein said condenser lens member is movable along its optical axis and said light source is electrically energized, said control means including a variable resistor adjusted in response to the position of said condenser lens member and varying the power supplied to energize said light source in response to the resistance of said variable resistance.

23. The optical projector of claim 19, wherein said light source is movable along the optical axis of said condenser lens member and is electrically energized, said control means including a variable resistor adjusted in response to the positioning of said light source and varying the power supplied to energize said light source in response to the resistance of said variable resistance.

24. The optical projector of claim 19, wherein said control means includes motor driven means for varying the distance between said light source and said condenser lens means in response to a variation in said light intensity.

25. The optical projector of claim 19, wherein said control means decreases and increases said intensity concurrently with decreases and increases with said distance respectively.

* * * * *